US 6,705,769 B2

(12) United States Patent
Brezina et al.

(10) Patent No.: US 6,705,769 B2
(45) Date of Patent: Mar. 16, 2004

(54) PACKAGING ARCHITECTURE FOR A MULTIPLE ARRAY TRANSCEIVER USING A FLEXIBLE CABLE

(75) Inventors: Johnny R. Brezina, Austin, TX (US); Brian M. Kerrigan, Austin, TX (US); Gerald D. Malagrino, Jr., Rochester, MN (US); James R. Moon, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 10/006,835

(22) Filed: Nov. 5, 2001

(65) Prior Publication Data

US 2003/0103734 A1 Jun. 5, 2003

Related U.S. Application Data

(63) Continuation-in-part of application No. 09/956,771, filed on Sep. 20, 2001, now abandoned.

(51) Int. Cl.[7] .................................................. G02B 6/42
(52) U.S. Cl. ......................................................... 385/88
(58) Field of Search ..................................... 385/88–94

(56) References Cited

U.S. PATENT DOCUMENTS

2002/0146218 A1  10/2002  Stricot et al. ................. 385/88
2003/0085452 A1   5/2003  Brezina et al. ............. 257/666
2003/0086244 A1   5/2003  Brezina et al. ............. 361/704
2003/0086660 A1   5/2003  Brezina et al. ............... 385/88
2003/0103336 A1   6/2003  Brezina et al. ............. 361/743
2003/0103735 A1   6/2003  Anderson et al. ............. 385/91
2003/0103737 A1   6/2003  Brezina et al. ............... 385/92

Primary Examiner—John D. Lee
Assistant Examiner—Sarah U Song
(74) Attorney, Agent, or Firm—Cardinal Law Group; Casimer K. Salys

(57) ABSTRACT

The packaging architecture for a multiple array transceiver using a flexible cable of the present invention provides a 90-degree transition between an optical signal input at a communications chassis bulkhead and an interior board within the communications chassis. The packaging architecture system comprises a forward vertical carrier having an optical converter, a paddle card, a flexible cable operably connected between the forward vertical carrier and the paddle card, and a rearward horizontal I/O block operably connected to the paddle card, the rearward horizontal I/O block oriented about 90 degrees from the forward vertical carrier. The multiple array transceiver makes the 90-degree transition within a narrow gap established by industry and manufacturer standards. The multiple array transceiver further provides cooling through a heat sink.

23 Claims, 5 Drawing Sheets

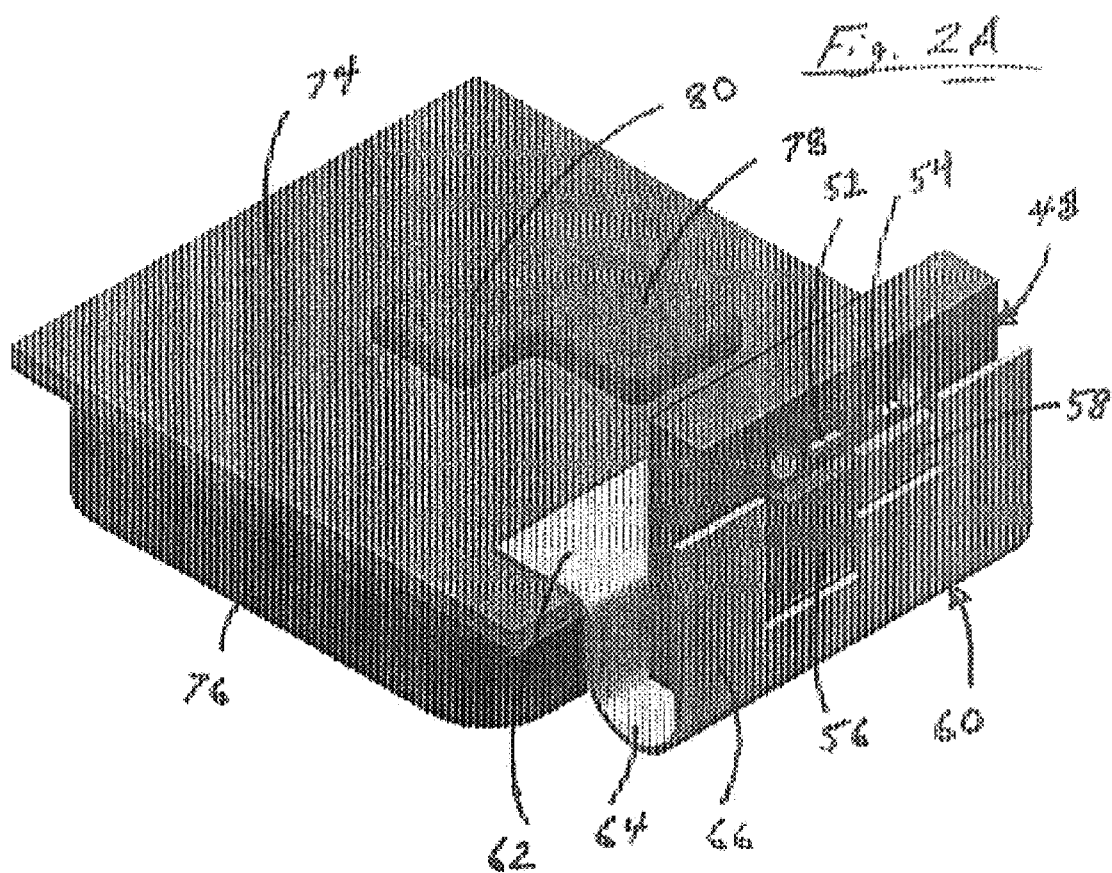

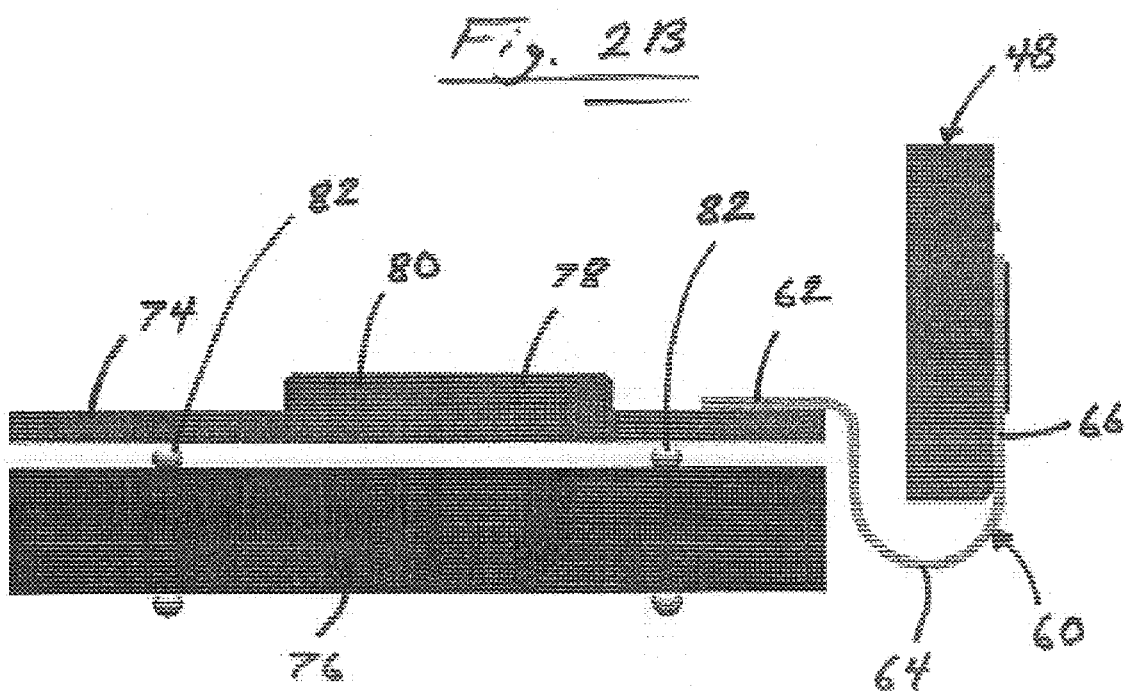

PACKAGING ARCHITECTURE FOR A MULTIPLE ARRAY TRANSCEIVER USING A FLEXIBLE CABLE

RELATED APPLICATIONS

This application is a continuation-in-part of and claims priority to U.S. patent application Ser. No. 09/956,771 filed on Sep. 20, 2001, now abandoned, entitled "Fiber Optic Transceiver, Connector, And Method of Dissipating Heat" by Johnny R. Brezina, et al., the entire disclosure of which is incorporated by reference, herein.

This application also relates to the following applications, filed concurrently herewith:
"Optical Alignment In A Fiber Optic Transceiver", by Johnny R. Brezina, et al. (U.S. application Ser. No. 10/007,027);
"External EMI Shield For Multiple Array Optoelectronic Devices", by Johnny R. Brezina, et al. (U.S. application Ser. No. 10/006,644);
"Packaging Architecture For A Multiple Array Transceiver Using A Continuous Flexible Circuit", by Johnny R. Brezina, et al. (U.S. application Ser. No. 10/007,026);
"Flexible Cable Stiffener for An Optical Transceiver", by Johnny R. Brezina, et al. (U.S. application Ser. No. 10/007,028);
"Enhanced Folded Flexible Cable Packaging for Use in Optical Transceivers, by Johnny R. Brezina, et al. (U.S. application Ser. No. 10/006,836);
"Apparatus and Method for Controlling an Optical Transceiver", by Johnny R. Brezina, et al. (U.S. application Ser. No. 10/007,024);
"Internal EMI Shield for Multiple Array Optoelectronic Devices", by Johnny R. Brezina, et al. (U.S. application Ser. No. 10/006,834);
"Multiple Array Optoelectronic Connector with Integrated Latch", by Johnny R. Brezina, et al. (U.S. application Ser. No. 10/007,023);
"Mounting a Lens Array in a Fiber Optic Transceiver", by Johnny R. Brezina, et al. (U.S. application Ser. No. 10/006,837);
"Packaging Architecture for a Multiple Array Transceiver Using a Flexible Cable and Stiffener for Customer Attachment", by Johnny R. Brezina, et al. (U.S. application Ser. No. 10/006,838);
"Packaging Architecture for a Multiple Array Transceiver Using a Winged Flexible Cable for Optimal Wiring", by Johnny R. Brezina, et al. (U.S. application Ser. No. 10/006,839); and
"Horizontal Carrier Assembly for Multiple Array Optoelectronic Devices", by Johnny R. Brezina, et al. (U.S. application Ser. No. 10/007,215).

TECHNICAL FIELD

The technical field of this disclosure is computer systems, particularly, a packaging architecture for a multiple array transceiver using a flexible cable.

BACKGROUND OF THE INVENTION

Optical signals entering a communications chassis can be converted to electrical signals for use within the communications chassis by a multiple array transceiver. The configuration of optical signal connections entering the communications chassis and the customer's circuit boards within the chassis require a 90-degree direction change in signal path from the optical to the electrical signal. This 90-degree configuration is required due to the right angle orientation between the customer's board and the rear bulkhead of the chassis. Existing multiple array transceiver designs use a number of small parts, such as tiny flexible interconnects with associated circuit cards and plastic stiffeners, to make the 90-degree transition. The size and number of the parts increases manufacturing complexity and expense.

In addition, existing multiple array transceivers are limited in the number of electrical signal paths they can provide between the optical input and the customer's board. It is desirable to provide as many electrical signal paths as possible, because optical fiber can typically provide a greater information flow rate than electrical wire. Industry and company standards further limit the space available for signal paths from the optical input to the customer's board, limiting the space to a narrow gap.

Thermal considerations may also limit the signal carrying capacity of current multiple array transceivers. Heat is generated by electrical resistance as the signals pass through the conductors and as the signals are processed by solid-state chips within the transceivers. Limitations on heat dissipation can limit the data processing speed and reduce transceiver reliability.

It would be desirable to have a packaging architecture for a multiple array transceiver using a folded flexible cable that would overcome the above disadvantages.

SUMMARY OF THE INVENTION

The packaging architecture for a multiple array transceiver using a flexible cable of the present invention provides a 90-degree transition between an optical signal input at a communications chassis bulkhead and an interior board within the communications chassis. The packaging architecture system comprises a forward vertical carrier having an optical converter, a paddle card, a flexible cable operably connected between the forward vertical carrier and the paddle card, and a rearward horizontal I/O block operably connected to the paddle card, the rearward horizontal I/O block oriented about 90 degrees from the forward vertical carrier. The multiple array transceiver makes the 90-degree transition within a narrow gap established by industry and manufacturer standards. The multiple array transceiver further provides cooling through a heat sink.

One aspect of the present invention provides a packaging architecture for a multiple array transceiver providing a 90-degree transition between the customer's board and the rear bulkhead of the chassis.

Another aspect of the present invention provides a packaging architecture for a multiple array transceiver with a reduced number of components for manufacturing ease and reduced cost.

Another aspect of the present invention provides a packaging architecture for a multiple array transceiver providing an interconnection containing a very large number of signal paths in a narrow horizontal gap.

Another aspect of the present invention provides a packaging architecture for a multiple array transceiver providing a thermally efficient design with heat flow to a heat sink.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIGS. 2A & 2B show isometric diagrams of a forward vertical carrier in place in an I/O assembly made in accordance with the present invention.

DESCRIPTION OF THE PREFERRED EMBODIMENT

The present invention is shown and described by the following description and figures, and is generally described in the order in which the individual components are assembled during manufacture.

Figure 1:
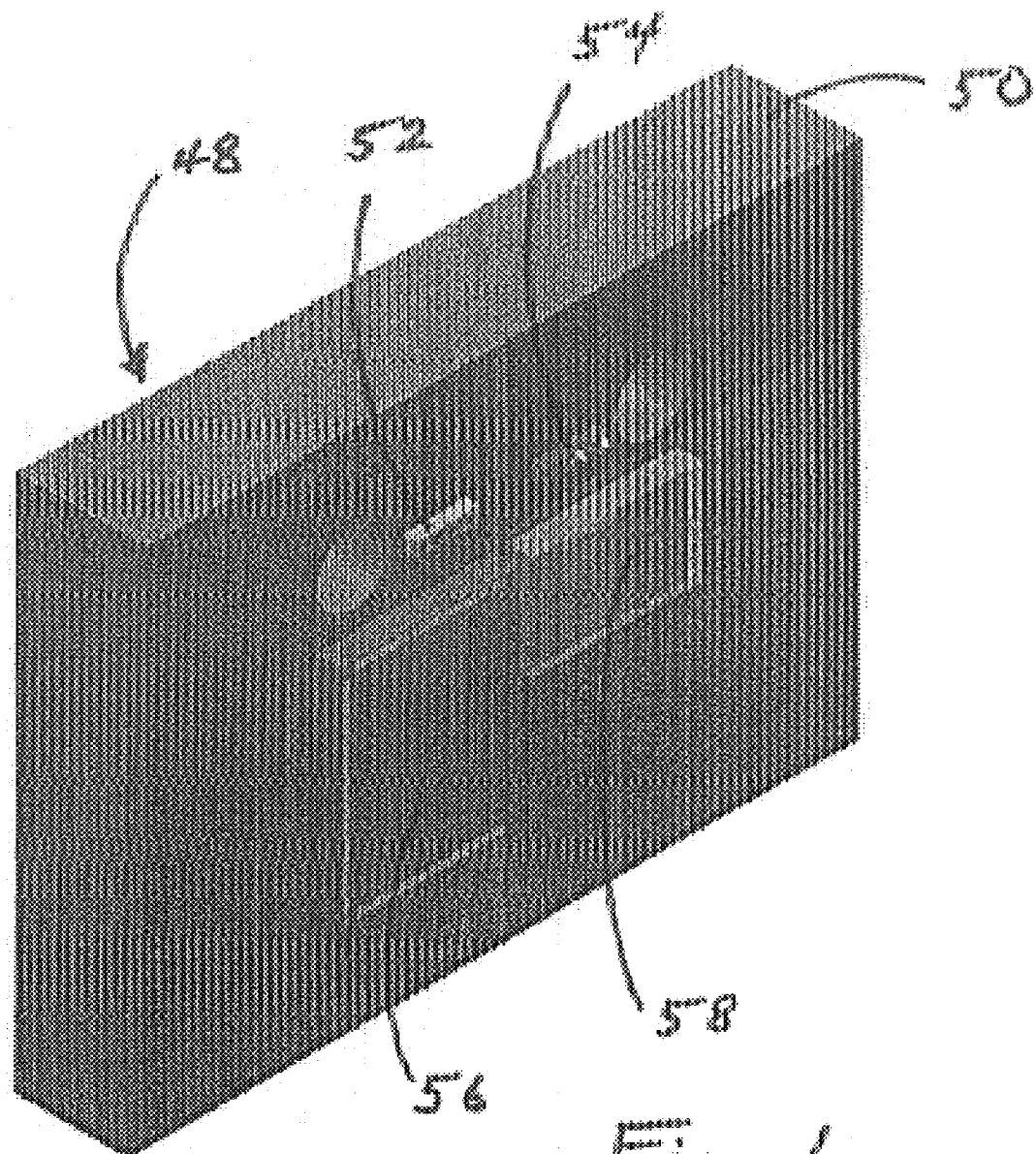
FIG. 1 shows an isometric diagram of a forward vertical carrier made in accordance with the present invention.

FIG. 1 shows an isometric diagram of a forward vertical carrier made in accordance with the present invention. The forward vertical carrier 48 comprises common substrate carrier 50, laser die 52, photodetector die 54, laser drive amplifier (LDA) 56, and transimpedance amplifier (TIA) 58. Laser die 52 and photodetector die 54 are attached to a common substrate carrier 50 by using standard die bond epoxy material and technique as will be appreciated by those skilled in the art. The LDA 56 and TIA 58 are also die bonded to the substrate carrier 50 in close proximity to the laser die 52 and photodetector die 54 to provide short critical transmission interconnection wire bond lengths. The TIA 58 acts as the photodetector interface chip. The laser die 52 and photodetector die 54 are precisely aligned to provide optimum communication with a fiber optic cable which can be attached to the laser die 52 and photodetector die 54.

The laser die 52 and photodetector die 54 with their associated circuits perform as optical converters to convert a light signal coming into the transceiver to an electrical signal or convert an electrical signal from the transceiver to a light signal. In one embodiment, the optical converters can be lasers only, so that the transceiver only transmits optical signals. In another embodiment, the optical converters can be photodetectors only, so that the transceiver only receives optical signals. In other embodiments, the number of lasers and photodetectors can be predetermined to meet the number of transmit and receive channels desired.

FIGS. 2A & 2B, in which like elements have like reference numbers, show isometric diagrams of a forward vertical carrier in place in an I/O assembly made in accordance with the present invention. A flexible cable is provided between the forward vertical carrier and a paddle card, which connects to a rearward horizontal I/O block.

The paddle card 74 can be any stiff material providing a connection for the flexible cable 60 and a platform for mounting electrical components. The paddle card 74 can be glass epoxy as typically used for printed circuit boards, but can be other materials, such as ceramics. In one embodiment, the paddle card 74 can be a two-sided printed circuit board. Typically, the paddle card 74 can comprise multiple signal layers for a plurality of signals, grounds, and power. Signal paths can also be provided from one side of the paddle card 74 to the other, and between signal layers, through vias.

A flexible cable 60 comprises an electrical portion 62, a transfer portion 64, and an optical portion 66. The flexible cable 60 electrically connects the paddle card 74 to the forward vertical carrier 48, where the laser die 52 and photodetector die 54 are located. The flexible cable 60 can contain a plurality of conductors carrying a plurality of signals. The flexible cable 60 can be narrow to allow passage through a narrow gap. This allows the J-shaped interconnection between the rearward horizontal I/O block 76 and forward vertical carrier 48 to contain a very large number of signals in a narrow horizontal gap. The transfer portion 64 provides the 90 degree transition between the generally vertical forward vertical carrier 48 and the generally horizontal I/O block 76, through the paddle card 74.

The flexible cable 60 can be attached to the paddle card 74 and the forward vertical carrier 48. The optical portion 66 can be adhesively bonded to the face of the forward vertical carrier 48 where the electronic components are mounted. The optical portion 66 can be terminated in a profile around the LDA 56 and TIA 58 to match the shape of the LDA 56 and TIA 58 to provide ease of connection. The optical portion 66 can have wire bond pads in the area around the LDA 56 and TIA 58 to allow wire bonding to the dies.

The electrical portion 62 can be adhesively bonded and wire bonded to the top face of the paddle card 74, which provides the connections between the electrical portion 62, receiver post amplifier 78, and eeprom 80. In an alternate embodiment, a hot bar bonded connection can be made between the electrical portion 62 and the paddle card 74. The paddle card 74 provides both the flat horizontal surface for the solder ball 82 connection to the I/O block 76 and circuit attachment for the receiver post amplifier 78 and eeprom 80, so a stiffener on the flexible cable 60 is not required. The receiver post amplifier 78 and eeprom 80 dies are wire bonded to the paddle card 74 to provide electrical connection and are encapsulated with molded potting compound to dissipate heat into a heat sink.

Figure 3A:
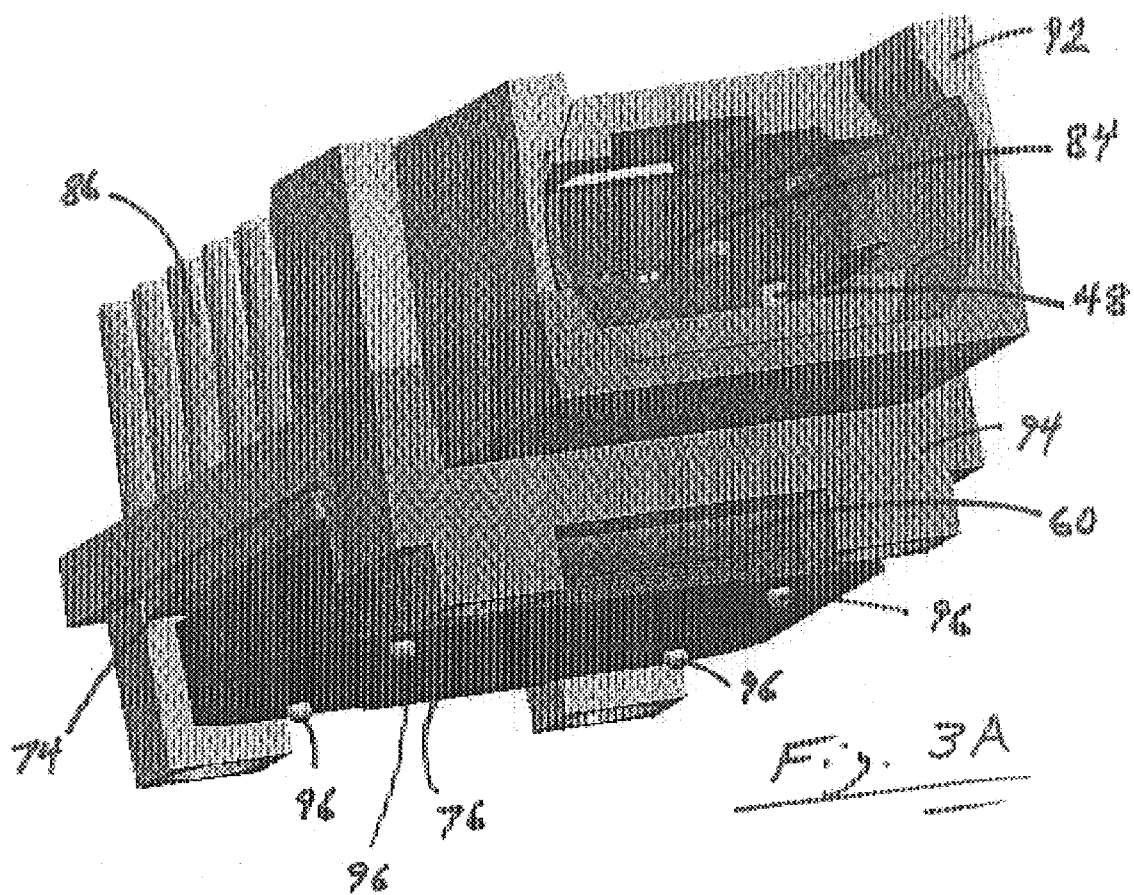
FIGS. 3A & 3B show isometric diagrams of a packaging architecture for a multiple array transceiver using a flexible cable made in accordance with the present invention.
Figure 3B:
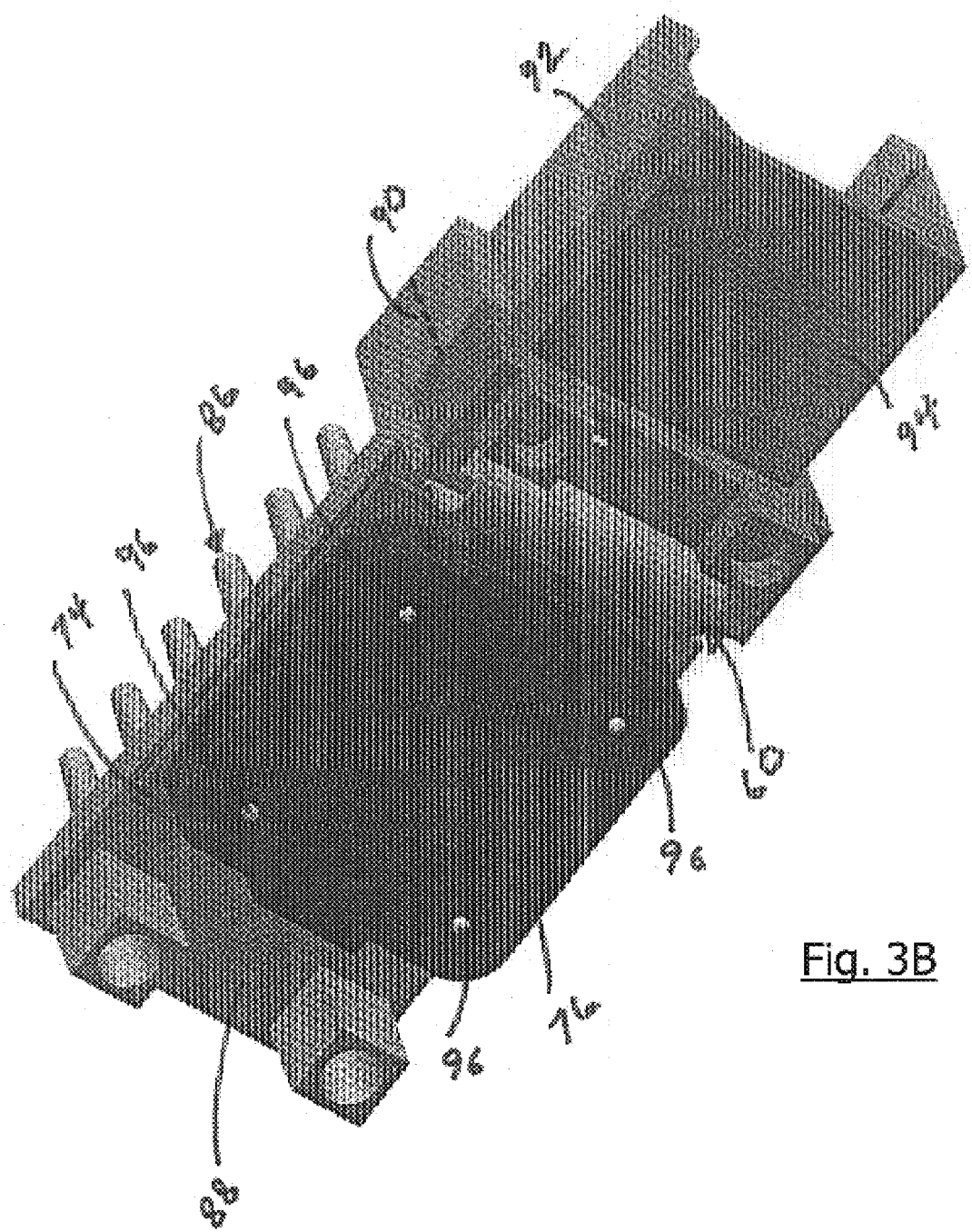

FIGS. 3A & 3B, in which like elements have like reference numbers, show isometric diagrams of a packaging architecture for a multiple array transceiver using a flexible cable made in accordance with the present invention.

Referring to FIG. 3A, the optical lens assembly 84 is aligned and UV epoxy bonded to the forward vertical carrier 48. Precise alignment provides efficient optical signal transfer. The heat sink 86 provides the 90-degree angle between the forward vertical carrier 48 and the I/O block 76, as well as heat transfer from those elements. The paddle card 74 and forward vertical carrier 48 can be thermally connected to the heat sink 86 with adhesive, epoxy, or the like, as will be appreciated by those skilled in the art. The heat sink 86 can have fins, pins, vanes, passive cooling, or active cooling on the open surface to assist in heat transfer. The heat sink 86 can be made of any material with high thermal conductivity, such as aluminum or copper, and can be formed by various processes, such as die casting or machining.

Referring to FIG. 3B, the heat sink 86 incorporates a heat sink vertical portion 90 and a heat sink horizontal portion 88. The connection of the forward vertical carrier 48 and the paddle card 74 to the heat sink vertical portion 90 and a heat sink horizontal portion 88, respectively, provides the 90-degree angle between the forward vertical carrier 48 and the I/O block 76. This 90-degree configuration is required due to the right angle orientation between the customer's interior circuit board and the rear bulkhead of the chassis.

The heat sink 86 further comprises an upper retainer shell 92 to house a fiberoptic connector (not shown). After the forward vertical carrier 48 has been assembled onto the heat sink 86, a lower retainer shell 94 is attached to the upper retainer shell 92. In one embodiment, the upper retainer shell 92 and lower retainer shell 94 can be connected with an interleaved mating feature, such as a dovetail joint or other slideable joint. In another embodiment, the lower retainer shell 94 can be attached to the upper retainer shell 92 with two screws, which also pass through the customer board at specified hole locations to structurally anchor the lower retainer shell 94 to the customer board. An EMI assembly clip (not shown) can be slid over the upper retainer shell 92 and the lower retainer shell 94. The EMI assembly clip can provide both EMI and ground connection points to the customer chassis bulkhead.

This completes the assembly of the multiple array transceiver module. The module can be attached to the customer's board by connecting the I/O block 76 to the mating connector on the customer's board, and securing four screws from the back side of the customer's board into mounting screw locations on the heat sink 86 and the lower retainer shell 94. The module can be attached to the customer's board by reftow soldering the solder ball array 96 of the I/O block 76 to mating pad locations on the customer board.

It is important to note that the figures and description illustrate specific applications and embodiments of the present invention, and is not intended to limit the scope of the present disclosure or claims to that which is presented therein. While the figures and description present a 2.5 gigahertz, 4 channel transmit and 4 channel receive multiple array transceiver, the present invention is not limited to that format, and is therefore applicable to other array formats including dedicated transceiver modules, dedicated receiver modules, and modules with different numbers of channels. For example, other embodiments can include multiple in-line lasers and receivers or arrays of lasers and receivers, e.g., 8×8 or 16×16 grids. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A packaging architecture system for a transceiver comprising:
   a forward vertical carrier having an optical converter;
   a paddle card, the paddle card having a first side and a second side;
   a flexible cable operably connected between the forward vertical carrier and the first side of the paddle card, the flexible cable having a U-shaped curved transfer portion between the forward vertical carrier and the first side of the paddle card; and
   a rearward horizontal I/O block operably connected to the second side of the paddle card, the rearward horizontal I/O block oriented about 90 degrees from the forward vertical carrier.

2. The system of claim 1 wherein the optical converter is at least one laser.

3. The system of claim 1 wherein the optical converter is at least one photodetector.

4. The system of claim 1 further comprising an electronic component die thermally connected to the forward vertical carrier.

5. The system of claim 1 further comprising an electronic component die thermally connected to the paddle card.

6. The system of claim 1 further comprising a heat sink thermally connected to the forward vertical carrier.

7. The system of claim 1 further comprising a heat sink thermally connected to the paddle card.

8. The system of claim 1 further comprising a heat sink having a heat sink vertical portion and a heat sink horizontal portion, the heat sink vertical portion being attached to the forward vertical carrier and the heat sink horizontal portion being attached to the paddle card.

9. A packaging architecture system for a transceiver comprising:
   first means for supporting an optical converter;
   second means for supporting an I/O block, the second supporting means having a first side and a second side, the second supporting means oriented about 90 degrees from the first supporting means; and
   means for electrically connecting the optical converter and the I/O block;
   wherein the electrical connecting means is attached to the first side of the second supporting means, the electrical connecting means having a U-shaped curved transfer portion between the optical converter and the I/O block, and the I/O block is attached to the second side of the second supporting means.

10. The system of claim 9 wherein the optical converter is at least one laser.

11. The system of claim 9 wherein the optical converter is at least one photodetector.

12. The system of claim 9 further comprising an electronic component die thermally connected to the first supporting means.

13. The system of claim 9 further comprising an electronic component die thermally connected to the second supporting means.

14. The system of claim 9 further comprising means for removing heat thermally connected to the first supporting means.

15. The system of claim 9 further comprising means for removing heat thermally connected to the second supporting means.

16. The system of claim 9 further comprising means for removing heat, the heat removing means having a heat sink vertical portion and a heat sink horizontal portion, the heat sink vertical portion being attached to the second supporting means and the heat sink horizontal portion being attached to the second supporting means.

17. A packaging architecture system for a transceiver comprising:
   a heat sink, the heat sink having a first surface and a second surface, the first surface being oriented about 90 degrees from the second surface;
   a forward vertical carrier having an optical converter, the forward vertical carrier being attached to the first surface of the heat sink;
   a paddle card, the paddle card having a first side and a second side, the first side of the paddle card being attached to the second surface of the heat sink;
   a rearward horizontal I/O block, the rearward horizontal I/O block being attached to the second side of the paddle card; and
   a flexible cable operably connected between the forward vertical carrier and the first side of the paddle card, the flexible cable having a U-shaped curved transfer portion between the forward vertical carrier and the first side of the paddle card.

18. The system of claim 17 wherein the optical converter comprises at least one laser.

19. The system of claim 17 wherein the optical converter is at least one photodetector.

20. The system of claim 17 further comprising an electronic component die thermally connected to the forward vertical carrier.

21. The system of claim 20 wherein the electronic component is selected from the group consisting of a laser drive amplifier and a transimpedance amplifier.

22. The system of claim 17 further comprising an electronic component die thermally connected to the paddle card.

23. The system of claim 22 wherein the electronic component is selected from the group consisting of a receiver post amplifier and an eeprom.

* * * * *